United States Patent [19]

Masago

[11] Patent Number: 4,664,733
[45] Date of Patent: May 12, 1987

[54] METHOD OF MANUFACTURING COHERED FASTENERS

[75] Inventor: Atsushi Masago, Tokyo, Japan

[73] Assignee: Max Company, Ltd., Tokyo, Japan

[21] Appl. No.: 765,523

[22] Filed: Aug. 14, 1985

[30] Foreign Application Priority Data

Nov. 21, 1984 [JP] Japan .............................. 59-246905
Nov. 21, 1984 [JP] Japan .............................. 59-246906
Nov. 21, 1984 [JP] Japan .............................. 59-246908

[51] Int. Cl.⁴ .................... B65C 1/00; B31F 1/00; B21G 3/26; F16B 15/08
[52] U.S. Cl. .................... 156/212; 156/221; 10/29; 10/54; 59/74; 227/85; 411/443; 206/820
[58] Field of Search ............... 156/221, 227, 196, 212, 156/288, 242, 274.4, 309.6, 324.4, 330.9; 174/159; 227/85; 59/73, 74, 75; 10/29, 71, 45, 54; 411/457, 443; 206/347, 820; 264/296, 292.5, 319, 339

[56] References Cited

U.S. PATENT DOCUMENTS

| | | | |
|---|---|---|---|
| 2,522,656 | 9/1950 | Whalen | 156/221 |
| 3,234,572 | 2/1966 | Roser | 10/54 |
| 3,252,569 | 5/1966 | Matthews | 174/159 |
| 3,858,722 | 1/1975 | Haas | 206/820 |
| 3,954,176 | 5/1976 | Haytayan | 206/820 |
| 4,045,269 | 8/1977 | Voss et al. | 156/221 |
| 4,071,141 | 1/1978 | Gray | 206/820 |
| 4,113,906 | 9/1978 | Brandwein | 206/820 |
| 4,534,464 | 8/1985 | Lankton | 206/820 |

FOREIGN PATENT DOCUMENTS 58-20339 5/1983 Japan ............................... 59/72

Primary Examiner—Donald Czaja
Assistant Examiner—Louis Falasco
Attorney, Agent, or Firm—Cushman, Darby & Cushman

[57] ABSTRACT

Obliquely cohered fasteners may be formed by adhering wires with an adhesive coating to form a strip. The strip is then shaped so that the wires are formed into fasteners of the desired shape. The adhesive coating is then plasticized and while plasticized, each fastener is offset from the next to obtain the obliquely cohered fasteners. Then, the adhesive coating is rehardened. Instead of applying a single adhesive coating, the wires may be adhered with a first thermoplastic coating and a second coating of a non-self-adhesive resin. The second coating may be applied only to that portion of the first coating covering the fasteners. Alternatively, as the fasteners are offset, the second coating may be cracked between fasteners to weaken the second coating, allowing the fasteners to be more easily separated when desired. The off-setting may be performed by a device which applies a force to one of the ends of the fasteners while the other of the ends of the fasteners are displaced.

11 Claims, 26 Drawing Figures

METHOD OF MANUFACTURING COHERED FASTENERS

BACKGROUND OF THE INVENTION

1. Field of the Invention

This invention relates to cohered fasteners arranged in parallel with each other and in shank form each having a penerating point at one end thereof and a head at the other end thereof, as well as to oblique linked fasteners disposed in parallel with each other and successively displaced such that the axial positions thereof take a stepped form. This invention also relates to a method and apparatus for manufacture of such fasteners.

2. Description of the Prior Art

In the past, a plastic adhesive has been employed to adhere fasteners such as a plurality of nails to hold the shanks parallel in a plane. A fastener driving tool or the like is loaded with the cohered fasteners as they are, in stacked strip form. In use, the tool separates the nails from the strip as each nail is driven by a driver.

The driver is thus required to have the secondary capability of cutting the plastic adhesive coating layer as well as the ability to drive the nails. The tool is disadvantageous in that its dimensions have to be made relatively large since the adhesive coating layer is generally rigid and has a great honding force thereby requiring a considerable force to accomplish the cutting.

The surface of the adhesive coating layer when hardened may typically remain sticky, so that the cohered fasteners adhere to each other during production or when packaged which is disadvantageous in that the fasteners are prevented from being taken out of a package or an apparatus.

A prior art fastener driving tool for linked fasteners has been well known in which the magazine is loaded with nails arranged in a strip and in which the nails positioned at the forward end are successively separated from the strip as each nail is driven. The conventional fastener driving tool is provided with a magazine which extends rearwardly from the tool nose such that nails are successively fed forward to the nose which incorporates a driver and serves to drive the nails. The elongated magazine is mounted to horizontally extend rearwardly from the nose which is disposed perpendicular to the main body of the tool. For this reason, this tool uses nails disposed in a strip in such a manner that the shanks thereof are parallel and flush with each other in the same axial direction and at the same level.

A proposal has been made to provide a fastener driving tool which is designed such that the nose can be fully extended without interfering with the other magazine components and the like which are disposed peripherally of the nose. Such a tool could be used to drive a nail in tight places such as corners and the like of an item of woodwork. To this end, the so-called "hip-up" type magazine has been proposed wherein the base of the magazine is inclined contiguous to the nose in the upward direction. The cohered fasteners to be used in such a magazine are obliquely held together as a whole in such a manner that the shanks thereof are gradually staggered in a stepped fashion. As a result, the head and penerating point of each of the nails are connected in a vertically staggered relation to the adjacent ones in the axial direction so that a series of these obliquely cohered fasteners form an extremely complicated overall configuration. Conventionally, to manufacture such obliquely cohered fasteners, a plurality of individually formed or molded fasteners are disposed in parallel with each other in a successively staggered fashion and then adhered to each other. This greatly complicates production and the apparatus therefor.

SUMMARY OF THE INVENTION

This invention is proposed in view of the problems associated with the prior art. The present invention provides a form of cohered fasteners which can be secured together in contiguous relation with high reliability and wherein separation of a fastener to be driven is facilitated. An adhesive coating layer of higher strength is employed with which a plurality of fasteners can be bonded together in a stable contiguous relationship without inadvertently sticking one fastener to another.

According to the present invention a plurality of fasteners are arranged in a contiguous and parallel relation to each other and are displaceable in a stepped fashion in the axial direction. Adjacent fasteners, either arranged with shanks flush or obliquely offset, are adhered to each other by a first coating of thermoplastic resin which may tend to be sticky. Therefore, the exterior of the first coating is coated with a second coating of a resin that will not stick to itself.

The present invention also simplifies production of the obliquely cohered fasteners as compared to the prior art. To form such cohered fasteners, contiguous and parallel collated wires are adhered with an adhesive to form a cohered element. This cohered element is cut across the wires and the severed segments are formed into the predetermined configuration of the fasteners. Then the collated wires in the cohered element are gradually vertically staggered in the axial direction with the adhesive in a plasticized condition, so that their axes are arranged in vertically stepped fashion. According to the present invention, the head and penerating point of each of the fasteners, as obliquely adhered, may be readily processed and molded. Further, the invention readily enable fasteners to be adhered with each other in a gradually stepped fashion.

Although the preferred embodiments are described with reference to cohered nails, the present invention may be employed to adhere any type of fastener.

BRIEF DESCRIPTION OF THE DRAWINGS

These and other objects and advantages of this invention will become more apparent and more readily appreciated from the following detailed description of the presently preferred specific example embodiments, taken in conjuction with the accompanying drawings, of which.

DETAILED DESCRIPTION OF THE PRESENTLY PREFERRED SPECIFIC EXAMPLE EMBODIMENTS

Figure 1A:
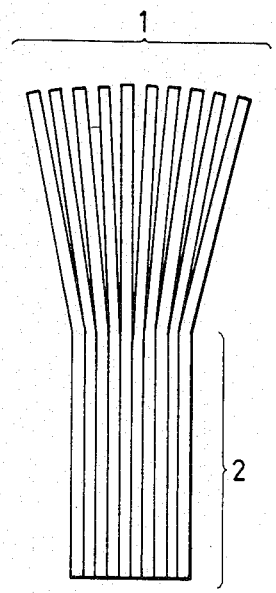
FIG. 1A is a top plan view of a plurality of juxtaposed wires.
Figure 1B:
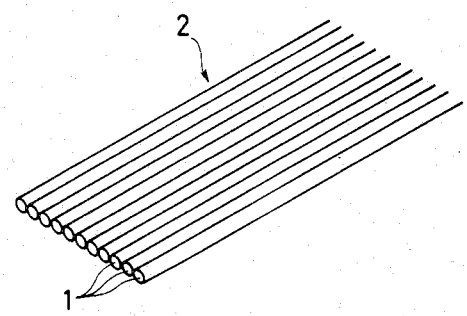
FIG. 1B is a perspective view of the wires of FIG. 1A.
Figure 2A:
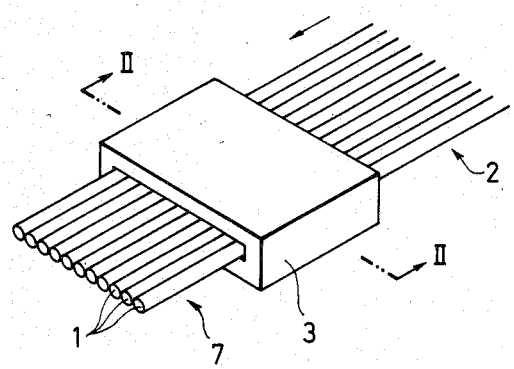
FIG. 2A is a schematic perspective representation illustrating the manner in which the wires are coated with adhesive.
Figure 2B:
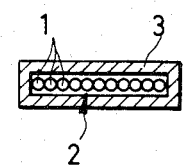
FIG. 2B is a sectional view taken along the II—II line of FIG. 2A.
Figure 3A:
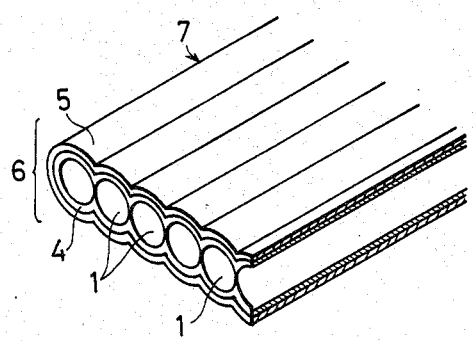
FIG. 3A is an enlarged fragmentary perspective view showing a first embodiment of the manner in which the wires may be coated with the adhesive coating layer.

The cohered fasteners according to one embodiment of the present invention consist of a plurality of nails each having a point at one end thereof and a transversely extending head at the other end thereof. To manufacture such cohered nails, a plurality of collated wires 1 are initially arranged side by side in juxtaposition with each other as shown in FIGS. 1A and 1B. As illustrated in FIGS. 2A and 2B, a group 2 of wires 1 are passed through an adhesive coating reservoir 3 for application of adhesive to the periphery of group 2 so as to join collated wires 1. The adhesive may advantageously be a thermpolastic resin such as nitril rubber resin. As illustrated in FIG. 3A, a first coating 4 of the thermoplastic resin is covered with a second coating 5 of nitrocellulose resin. An adhesive coating layer 6, made up of the first and second coatings 4 and 5 serves to bond collated wires 1 together. During application, first coating 4 of thermoplastic resin is plasticized by heating to improve pliability, thereby ensuring firm self-adhesion. Second coating 5 is stronger in laminar structure than first coating 4 and lacks pliability and self-adhesion.

Figure 3B:
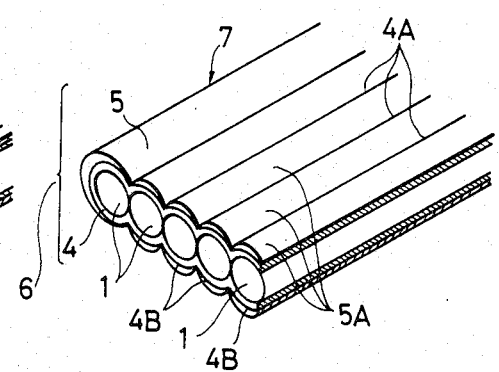
FIG. 3B is an enlarged fragmentary perspective view showing a second embodiment of the manner in which the wires may be coated.

Bonded element or member 7 includes group 2 of the wires bonded and unified by adhesive coating layer 6, and may be stored or further processed. Cohered element 7 is shown in FIG. 3A as having adhesive coating layer 6 consisting of first coating 4 which is applied to cover the whole exterior of group 2 and second coating 5 which is applied to cover the entire surface of first coating 4. Alternatively, as shown in FIG. 3B, second coating 5 may be applied to cover only the upper and lower sides 4B of first coating 4, and not the discontinuous portions 4A at the junction between the adjacent wires, thus forming only crescent portions 5A. More specifically, second coating 5 is applied in this manner mainly to prevent cohered element 7 from adhering to either itself when it is rolled or to another cohered element 7 when elements 7 are laid on the top of other. Crescent portions 5A are acceptable since valleys 4A do not abut against any other portions.

Figure 4:
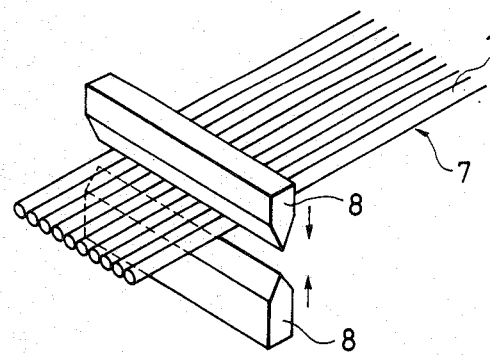
FIG. 4 is a perspective view schematically showing the manner in which a collated element is cut.
Figure 5A:
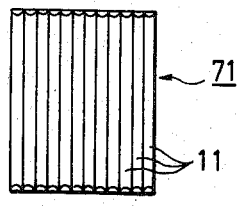
FIG. 5A is a top plan view of the collated element after being severed.
Figure 5B:
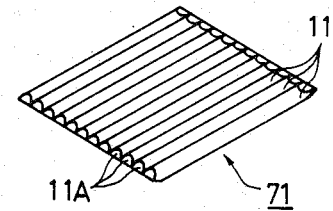
FIG. 5B is a perspective view of the collated element of FIG. 5A.

As illustrated in FIG. 4, cohered element 7 is then cut along a line perpendicular to the axes of wires 1 with a cutter 8 into lengths suitable for nails. The resulting square cohered element 71 comprises nails arranged in a continuous and parallel relation with opposite ends of shanks 11 flush with each other, as shown in FIGS. 5A and 5B. When square cohered element 71 are cut, penerating points on at least one end 11A of shanks 11 may be simultaneously formed.

Figure 6A:
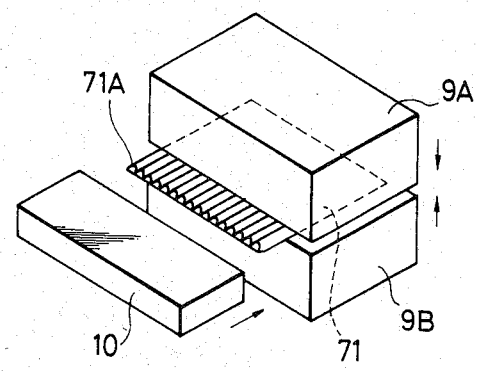
FIGS. 6A, 6B, 7A and 7B schematically illustrate the manner in which the head of each nail is molded.
Figure 6B:
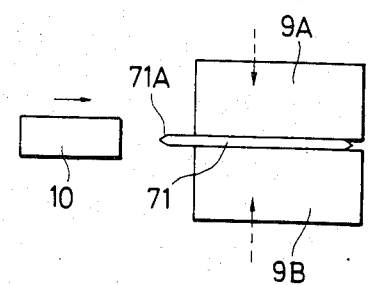
Figure 7A:
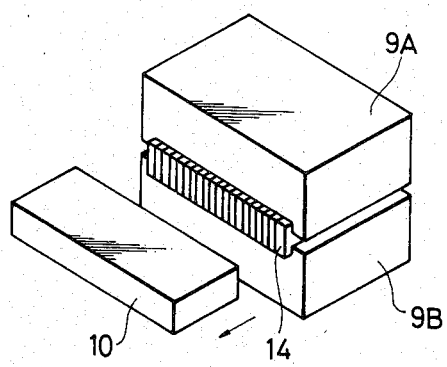
Figure 7B:
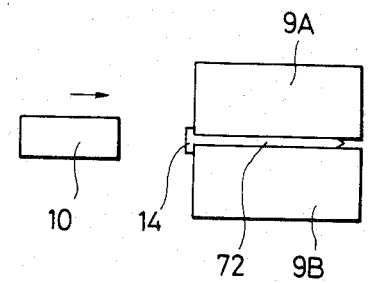
Figure 8A:
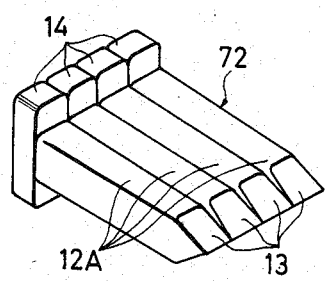
FIG. 8A is a perspective view of the nails in contiguous relation with the ends thereof flush with each other.
Figure 8B:
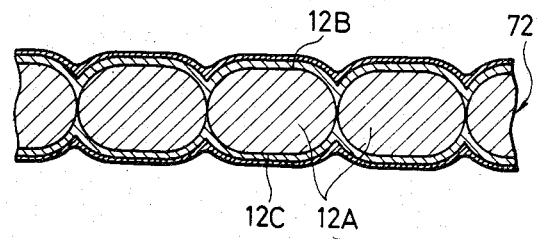
FIG. 8B is an enlarged sectional view of the nails of FIG. 8A.
Figure 9A:
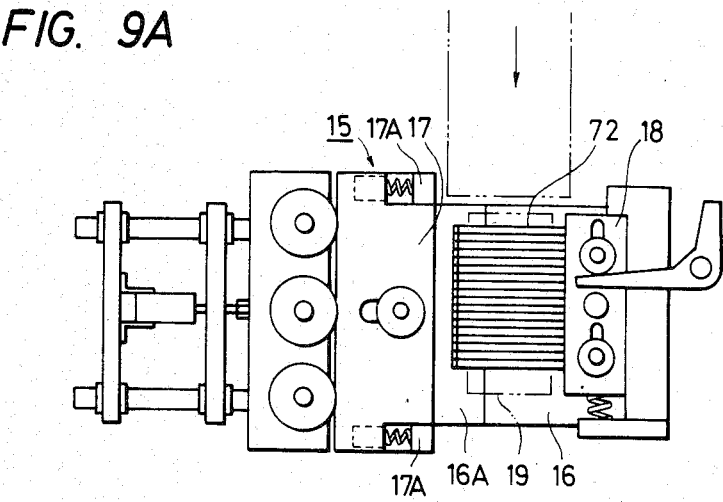
FIGS. 9A, 9B and 9C are top plan views of an apparatus for machining obliquely cohered fasteners in various stages of manufacture.
Figure 9B:
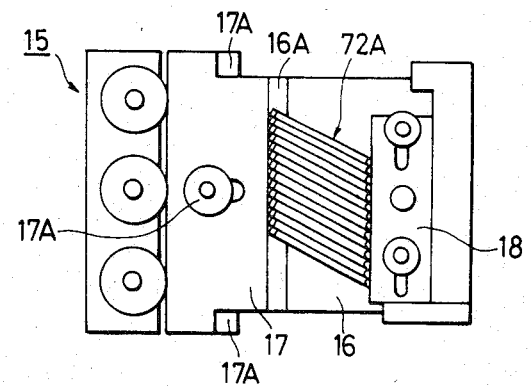
Figure 9C:
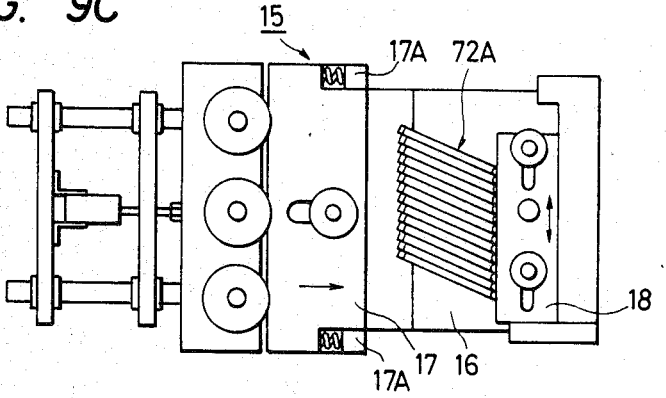
Figure 9D:
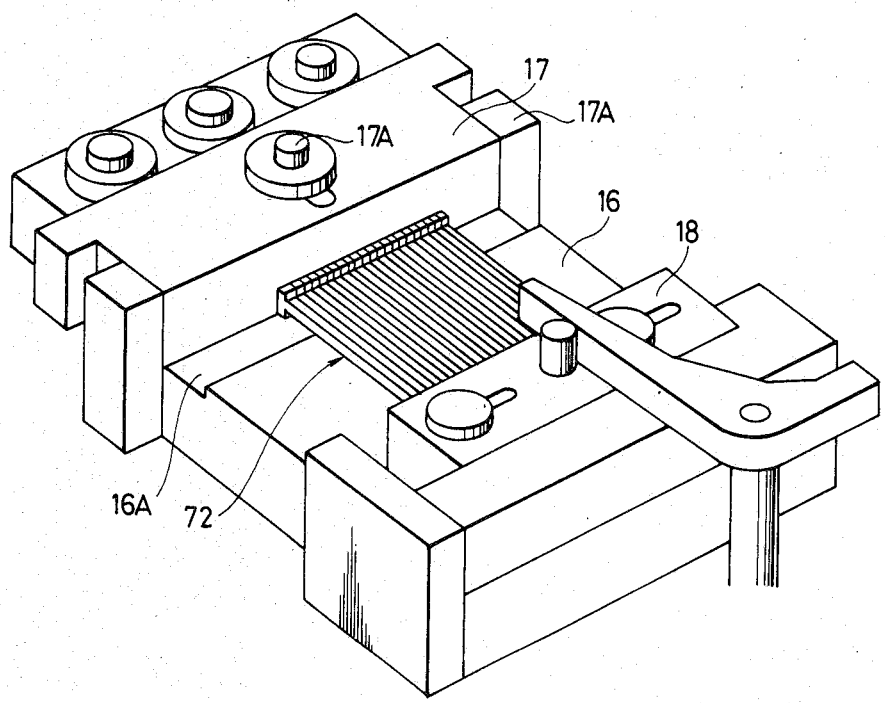
FIGS. 9D and 9E are perspective views of the apparatus of FIGS. 9A-9C in stages of manufacture corresponding to 9A and 9B, respectively.
Figure 9E:
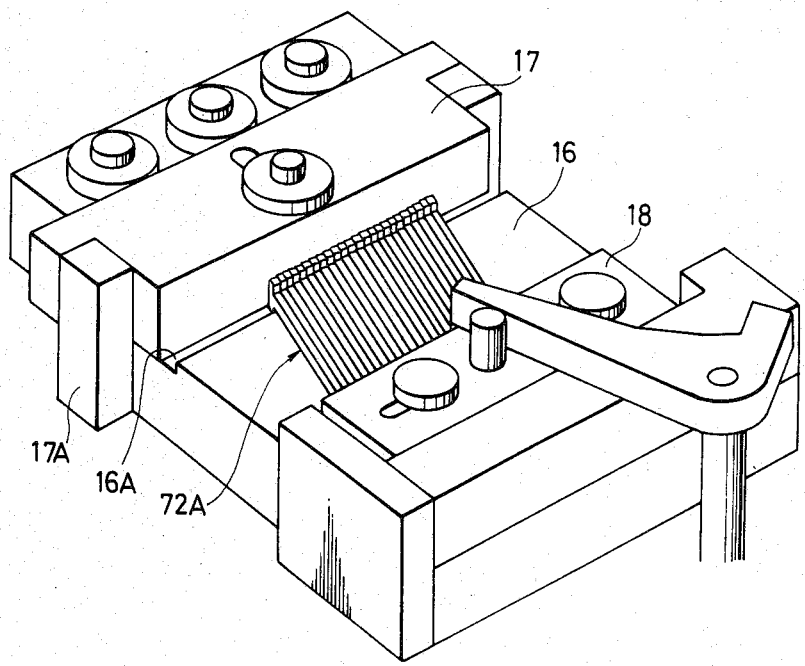

Square cohered element 71 is then held between molds 9A and 9B (see FIGS. 6A-6B) with ends 71A of shanks 11 slightly extending therefrom. Ends 71A are then driven with a hammer 10 (FIGS. 6B, 7A and 7B) axially applied thereto and machined to form heads 14 of staple shanks 11. In this manner, finished square cohered fasteners 72, as shown in FIG. 8A, are obtained. One of the ends of shanks 12A of square cohered fastenres 72 have penerating points 13 and the other ends of shanks 12A have heads 14 of a T-shaped configuration. In this example, each nail shank 12A is pressed by molds 9A and 9B to render the opposite sides 12B, 12C thereof flat so as to provide an oval configuration in cross section.

Square cohered fasteners 72 are then conveyed to a station where they are tilted by a deforming means 15 as shown in FIGS. 9A-9E. Deforming means 15 comprises a platform 16 on which square cohered fasteners 72 are carried. A pressure block 17 faces the heads of the nail shanks on platform 16. A movable block 18 is arranged to face the points of the shanks. A heater 19 on platform 16 can move toward and away from the shanks. Pressure block 17 moves on platform 16 to contact the heads of the shanks and hold square cohered fasteners 72 on platform 16 between itself and movable block 18. Movable block 18 moves parallel to the face of pressure block 17 on platform 16 along the row of fasteners 72.

Square cohered fasteners 72, as conveyed by a suitable feed means to deforming means 15, are laid on platform 16. Platform 16 is made with a step 16A (see FIGS. 9D and 9E) at a lower level than the platform for receiving therein the head flanges of the shanks. Heater 19, which is normally kept away from the shanks of cohered fasteners 72, is now moved to contact these shanks. At the same time, pressure block 17 is moved close to the heads of the shanks to hold fasteners 72 between itself and movable block 18. Contact with heater 19 heats fasteners 72 to cause the thermoplastic resin of first coating 4 of adhesive coating composition 6 to plasticize, thus improving its pliability. Under such condition, movable block 18 is moved or slid along a line perpendicular to the axes of the nail shanks as heater 19 is separated from fasteners 72. This will displace the points of the nail shanks in the same direction as that of the movement of movable block 18 whereas the heads of the shanks are kept in contact with pressure block 17. As a result, square cohered fasteners 72 are tilted so as to assume an oblique configuration. In other words, the nails are staggered such as to lie at an angle with respect to the axes to the shanks, thus changing the configuration from a square to a diagonal shape. Pressure block 17 urges the heads of the nail shanks so that the distance between the heads and the points of the shanks decreases as a result of tilting of the fasteners. This action continues until pressure block 17 contacts a stopper means 17A. This will assure maintenance of the configuration of the obliquely or diagonally cohered fasteners with accuracy in terms of the dimensions defined by the movable and pressure blocks 18 and 17, respectively.

Figure 10:
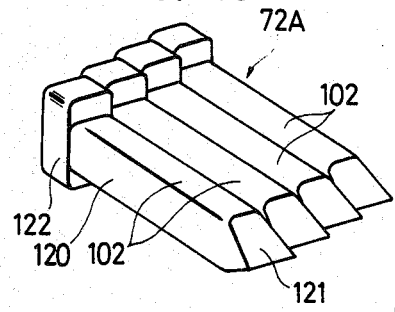
FIG. 10 is a perspective view of obliquely cohered fasteners manufactured according to the present invention.

Fasteners 72 are then left in the tilted position until first coating 4 of thermoplastic resin is cooled and hardened. In this connection, it is to be noted that a plurality of units each consisting of the platform, and the pressure and movable blocks may be arranged to successively deform the fasteners so that the time required for cooling them is saved, thus improving production efficiency. When the adhesive coating composition has hardened, obliquely cohered fasteners 72a have an assured stability of configuration and are then discharged out of deforming means 15 as the finished product illustrated in FIG. 10. During deformation, first coating 124 (see FIG. 11) of adhesive coating composition 123, which adhere the nail shanks, is plasticized by heating to enable positional staggering. Second coating 125 has a tendency to crack between the adjacent nail shanks under deformation such as occurs during tilting. This cracking is advantageous in that it allows nails to be readily separated one by one from the strip of obliquely cohered fasteners when the fastener driving tool is driven.

First coating 124 is formed of thermoplastic resin such as nitril rubber resin or the like whereas second coating 125 is formed of non-self-adhesive material such as nitrocellulose resin or the like.

Figure 11:
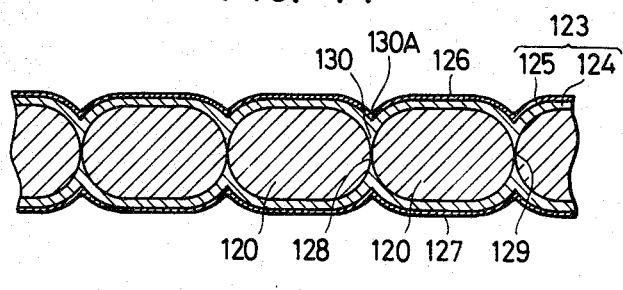
FIGS. 11, 12 and 13 are fragmentary enlarged sectional views of various modifications of the fasteners of FIG. 10.

FIG. 11 shows a cross sectional contour of each of the nails 102. Each collated wire or the like of circular cross section is cut and press-stamped to chamfer and bevel the upper and lower sides 126 and 127 thereof with the lateral sides 128 and 129 thereof left arcuate as made. The nails are connected in contiguous relation by causing each of the nails at one arcuate side 128 thereof to touch the adjacent nail at the other arcuate side 129 thereof. Grooves 130, each of which is V-shaped in cross section, are defined by the arcuate sides of adjacent shanks 120 of individual nails 102 of cohered fasteners 72A and extend axially of the shanks. A further series of V-shaped grooves 130A are also formed by the adhesive coating composition 123 to follow the previously formed grooves 130.

The adhesive coating composition 123 is satisfactorily self-adhesive and pliable since the first coating 124 of thermoplastic resin is plasticized by heating to assure adhering of nails 102. In this connection, it is to be noted that first coating 124 tends to inadvertently adhere to the other cohered fasteners or the inner wall or the like of the magazine due to its self-adhesion and extensibility if it is exposed and makes contact therewith. Such inadvertent adhesion may be avoided by having adhesive coating composition 123 which comprises first coating 124 exteriorly coated with second coating 125 of nitrocellulose resin or the like. Second coating 125, if formed of a rigid layer such as nitro-cellulose resin as in the aforementioned embodiment, necessitates the use of great force when separating the nail to be driven from the strip during driving. This will render the nail susceptible to deformation if its shank is fine or small in diameter and this will prevent the nail from being correctly driven.

Figure 12:
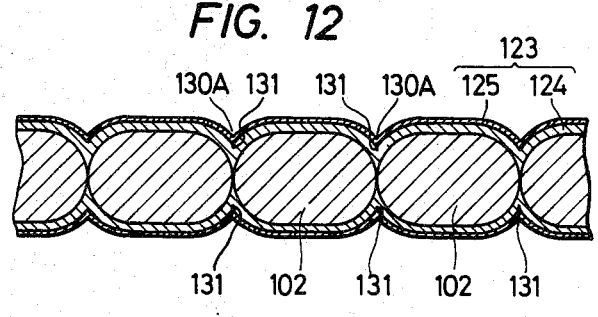
Figure 13:
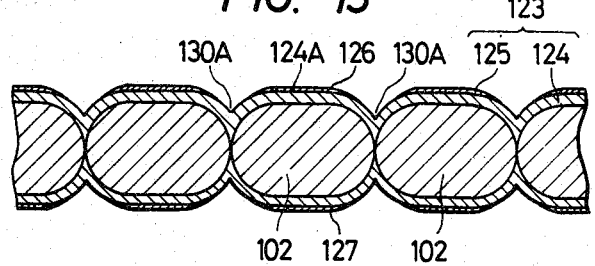

The aforementioned problem may, however, be readily solved by forming adhesive coating composition 123 in the manner shown in the embodiments illustrated in FIGS. 12 and 13.

More specifically, according to the embodiment shown in FIG. 12, second coating 125 of the adhesive coating composition 123 is provided with a fragile portion such as a crack 131 in each of V-shaped grooves 130A between adjacent nails 102 to enable ready separation of one nail from the other.

In accordance with the embodiment shown in FIG. 13, first coating 124 of adhesive coating composition 123 is formed in the same manner as in FIGS. 11 and 12 except that second coating 125 does not cover the entire exterior of first coating 124. In other words, V-shaped grooves 130A formed in first coating 124 are left as they are, and first coating portions 124A between grooves 130A, that is, only protions 124A over upper and lower sides 126 and 127 of each of nails 102, are coated with second coating 125. In this manner, adhesive coating composition 123 comprises only first coating 124 between the nails so as to render those portions fragile. Second coating 125 is applied to the upper and lower surfaces 124A of first coating 124. In other words, the areas of first coating 124 most susceptible to adhesion to the other cohered fasteners are fully covered with second coating 125 to sufficiently avoid inadvertent adhesion or the like.

Although in these embodiments a thermoplastic resin has been used as the plastic adhesive, it is to be understood that an adhesive which shows plasticity by use of a solvent may be employed. In this instance, a applicator such as a solvent sprayer should be used instead of the aforementioned heater.

Another embodiment of the invention will be explained by reference to FIG. 14 which illustrates cohered fasteners comprising a plurality of nails in contiguous relation and in a U-shaped form with a diagonally-shaped base. In this instance, a plurality of collated wires 1 are adhered together into a group 2 and are cut by cutting knife or cutter 8 such as to obtain cohered element 7. The wires are adhered and severed in the same manner as illustrated in FIGS. 1–4.

Figure 14A:
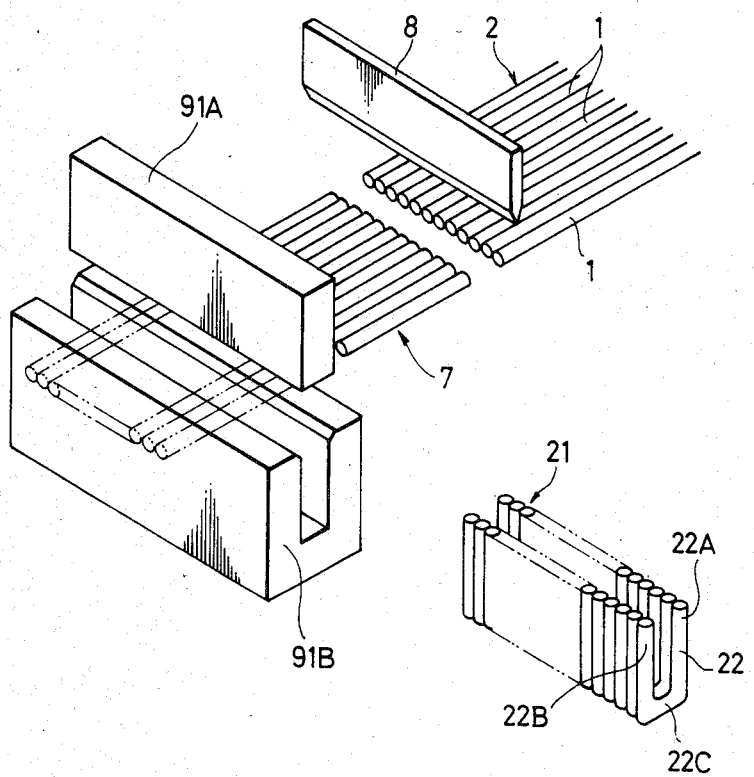
FIG. 14A is a schematic perspective view useful in aiding understanding of a second manufacturing method according to the present invention.
Figure 14B:
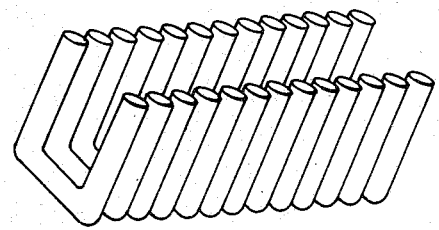
FIG. 14B is a schematic perspective view of a cohered staple strip after set on the apparatus as shown in FIG. 9.

Then, in this embodiment, the above described cohered element 7 is formed into a U-shape, as shown in FIG. 14, by placing cohered element 7 over die 91B and then driving die 91A between the extended portions of die 91B. The result is U-shaped cohered staple strip 21. Then, staples 22 of cohered staple strip 21 are offset using apparatus similar to that illustrated in FIGS. 9A-9E with the ends of legs 22A and 22B of staples 22 placed adjacet movable block 18 and crown portions 22C extending vertically adjacent pressure block 17. After setting a cohered staple strip 21 on the apparatus, a pressure block 17 applies both ends of legs 22A and 22B of staple strip 21 while a movable block 18 displaces the crown portions 22C of staple strip 21. The result is an obliquely cohered staple strip.

Preferably adhesive layers are applied only to legs 22A and 22B of staples 22, and not to crown portions 22C, when cohered staple set 21 is formed. Therefore, it is necessary to apply heat during offsetting only to legs 22A and 22B and not crown portions 22C. Accordingly, during offsetting a heater may be placed either on opposite exterior surfaces of legs 22A and 22B or between legs 22A and 22B to soften the inner adhesive coating.

According to the present invention, in the manufacture of the obliquely cohered fasteners, the penetrating points and the heads are machined and formed by arranging a plurality of collated wires in contiguous relation with ends forming a line perpendicular to the lengths of the wires. This will require neither a complicated cutter nor a mold. The adhesive coating composition applied to the nails comprises a double layer, that is, a first coating of thermoplastic resin and a second coating of non-self-adhesive resin which is applied to cover the exterior of the first coating. Therefore, the first coating of thermoplastic resin is not exposed over surfaces of the cohered fasteners, thus preventing the latter from adhering to other fasteners in the magazine or in a package of nails, thereby allowing the nails to be smoothly separated from the strip. Then the cohered fasteners may be offset.

As aforementioned, the first coating is self-adhesive and pliable so as to allow for variation in wall thickness when the positional staggering of the nails in contiguous relation is established. As the nails are offset, cracks are formed the second outer coating between nails. This allows the individual nails to be readily separated from the strip when driven by a driver.

Further, even if thermoplastic resin for the first coating is heated and plasticized, the cohered fasteners are not adhered to other cohered fasteners and the instrument during a process step since the surface of the first coating as plasticized is coated with the second coating of non-self-adhesive resin, thereby preventing the wires from interfering with a process step.

Although only several embodiments have been described in detail above, those skilled in the art will readily appreciate that many modifications are possible in the preferred embodiments without materially departing from the novel teachings and advantages of this invention. Accordingly all such modifications are intended to be included within the scope of the following claims.

What is claimed is:

1. A method of manufacturing obliquely cohered fasteners comprising the steps of:
    (a) adhering a plurality of contiguous, parallel wires to each other with an adhesive coating to form a strip;
    (b) shaping said strip into desired fasteners;
    (c) plasticizing said adhesive coating;
    (d) offsetting each of said fasteners from the next to obtain said obliquely cohered fasteners; and
    (e) rehardening said adhesive coating.

2. A method as in claim 1 further comprising the step of cutting said wires adhered in said step (a) perpendicular to said wires so that said wires are of desired lengths.

3. A method as in claim 1 wherein said shaping step (b) includes the step of forming a head at one end of each of said wires in said strip.

4. A method as in claim 3 wherein said shaping step (b) includes the step of flattening opposite sides of said wires forming surfaces of said strip.

5. A method as in claim 1 wherein said shaping step (b) includes the step of bending said strip so that each of said wires has a U-shape.

6. A method as in claim 1 wherein:
    said plasticizing step (c) includes the step of heating said adhesive coating; and
    said rehardening step (e) includes the step of cooling said adhesive coating.

7. A method as in claim 1 wherein said plasticizing step (c) includes the step of applying a solvent to said adhesive coating.

8. A method of manufacturing obliquely cohered fasteners comprising the steps of:
    (a) adhering a plurality of wires in contiguous relation with a first coating of thermoplastic resin and a second coating of non-self-adhesive resin covering the exterior of said first coating;
    (b) shaping said wires into desired fasteners;
    (c) heating said first coating to plasticize said thermoplastic resin;
    (d) offsetting each of said fasteners; from the next to obtain said obliquely cohered fasteners; and
    (e) cooling said fasteners to reharden said first coating.

9. A method as in claim 8 further comprising the step of cutting said strip formed in said adhering step (a) perpendicular to said wires.

10. A method as in claim 8 wherein said offsetting (d) weakens said second coating in areas between said shanks.

11. A method as in claim 8 wherein said adhering (a) applies said second coating only to portions of said first coating covering said wires and not to portions of said first coating between said wires.

* * * * *